United States Patent
Regula

(10) Patent No.: US 8,553,683 B2
(45) Date of Patent: Oct. 8, 2013

(54) THREE DIMENSIONAL FAT TREE NETWORKS

(75) Inventor: Jack Regula, Chapel Hill, NC (US)

(73) Assignee: PLX Technology, Inc., Sunnyvale, CA (US)

(*) Notice: Subject to any disclaimer, the term of this patent is extended or adjusted under 35 U.S.C. 154(b) by 161 days.

(21) Appl. No.: 13/176,350

(22) Filed: Jul. 5, 2011

(65) Prior Publication Data

US 2013/0010636 A1  Jan. 10, 2013

(51) Int. Cl.
*H04L 12/00* (2006.01)

(52) U.S. Cl.
USPC .................. 370/388; 370/387; 370/230

(58) Field of Classification Search
USPC ............ 370/386–388, 392, 230, 352, 360; 710/316
See application file for complete search history.

(56) References Cited

U.S. PATENT DOCUMENTS

| | | | |
|---|---|---|---|
| 2007/0025387 A1* | 2/2007 | Zhang | 370/447 |
| 2008/0052443 A1* | 2/2008 | Cassiday et al. | 710/316 |
| 2010/0061391 A1* | 3/2010 | Sindhu et al. | 370/412 |
| 2010/0061394 A1* | 3/2010 | Sindhu et al. | 370/422 |
| 2010/0165983 A1* | 7/2010 | Aybay et al. | 370/388 |
| 2011/0096781 A1* | 4/2011 | Aybay | 370/392 |
| 2011/0267942 A1* | 11/2011 | Aybay et al. | 370/230 |
| 2012/0155453 A1* | 6/2012 | Vohra et al. | 370/352 |

* cited by examiner

*Primary Examiner* — Dang Ton
*Assistant Examiner* — Sai Aung
(74) *Attorney, Agent, or Firm* — Beyer Law Group LLP

(57) ABSTRACT

In a first embodiment of the present invention, a non-blocking switch fabric is provided comprising: a first set of intra-domain switches; a second set of intra-domain switches; a set of inter-domain switches located centrally between the first set of intra-domain switches and the second set of intra-domain switches, wherein each of the ports of each of the inter-domain switches is connected to an intra-domain switch from the first or second set of intra-domain switches.

12 Claims, 13 Drawing Sheets

| Clos Network Scalability Using 96 Lane Switches | | | | |
|---|---|---|---|---|
| Edge port width | Interswitch link width | Number of switches | Number BUSes used | Number of edge ports |
| x16 | x16 | 9 | 20 | 18 |
| x16 | x8 | 18 | 38 | 36 |
| x16 | x4 | 36 | 74 | 72 |
| x8 | x16 | 9 | 20 | 36 |
| x4 | x16 | 9 | 20 | 72 |
| x8 | x8 | 18 | 38 | 72 |
| x8 | x4 | 36 | 74 | 144 |
| x4 | x8 | 18 | 38 | 144 |
| x4 | x4 | 36 | 74 | 288 |

FIG. 3

| Scalability of 5-stage SuperClos™ Networks Using 96 Lane Switches |||| Inter Domain Switch ||| Num Outside Edge Ports ||| |
|---|---|---|---|---|---|---|---|---|---|---|
| Intra Domain Split Clos |||| | | | Outside Edge Port Width ||| Total Num |
| Num Switc | Edge Ports | Port width || Num Switches | Edge Ports | Port width | x4 | x8 | x16 | Switches |
| | | Edge | Inner | | | | | | | |
| 24 | 144 | x4 | x4 | 1 | 24 | x4 | 3456 | 1728 | 864 | 576 |
| 12 | 72 | x4 | x8 | 1 | 12 | x8 | 864 | 432 | 216 | 144 |
| 6 | 18 | x8 | x16 | 1 | 12 | x8 | 432 | 216 | 108 | 72 |
| 6 | 9 | x16 | x16 | 1 | 6 | x16 | 216 | 108 | 54 | 36 |

| Scalability of 7-stage SuperClos™ Networks Using 96 Lane Switches ||||||| |||| |
|---|---|---|---|---|---|---|---|---|---|---|---|
| Intra Domain Split Clos |||| Inter Domain Clos Network |||| Num Outside Edge Ports ||| |
| Num Switc | Edge Ports | Port width || Num Switches | Edge Ports | Port width || Outside Edge Port Width ||| Total Num |
| | | Edge | Inner | | | Edge | Inner | x4 | x8 | x16 | Switches |
| 24 | 144 | x4 | x4 | 36 | 288 | | x4 | 41472 | 20736 | 10368 | 12096 |
| 24 | 144 | x4 | x4 | 18 | 144 | x4 | x8 | 20736 | 10368 | 5184 | 6048 |
| 12 | 72 | x4 | x8 | 18 | 144 | x4 | x8 | 10368 | 5184 | 2592 | 3024 |
| 24 | 144 | x4 | x4 | 9 | 72 | x4 | x16 | 10368 | 5184 | 2592 | 3024 |
| 12 | 72 | x4 | x8 | 9 | 72 | x4 | x16 | 5184 | 2592 | 1296 | 1512 |
| 6 | 18 | x8 | x16 | 18 | 36 | x8 | x16 | 1296 | 648 | 324 | 540 |
| 6 | 9 | x16 | x16 | 9 | 18 | x16 | x16 | 648 | 324 | 162 | 189 |

FIG. 4

| ID Routing Prefix ||||||||||||||||||||||||||||||||
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| `Prefix |||||||| P-Type=`PullRd |||| Reserved |||| Destination GRID ||||||||||||||||
| Notes |||||||||||||||||||||||||||||||||
|  | Used on remote read requests of pull protocol and both read and write requests mapped via NTB ALUT |||||||||||||||||||||||||||||||

| Interdomain Routing Prefix ||||||||||||||||||||||||||||||||
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| `Prefix |||||||| P-Type=`InterD |||| Reserved |||| Source Domain |||||||| Destination Domain ||||||||
| Notes |||||||||||||||||||||||||||||||||
|  | Must follow ID routed Read Request Prefix if Source and destination are in different domains |||||||||||||||||||||||||||||||
|  | Must be added to A-LUT space memory requests if source and destination are in different commands |||||||||||||||||||||||||||||||
|  | Must be added to all read completions if source and destination are in different domains |||||||||||||||||||||||||||||||
|  | The Source domain of a Interdomain read request prefix must be saved in the NTB read request scoreboard and used in creation of Interdomain Routing Prefix for the returning completion |||||||||||||||||||||||||||||||

FIG. 9

THREE DIMENSIONAL FAT TREE NETWORKS

BACKGROUND OF THE INVENTION

1. Field of the Invention

The present invention relates generally to electronic communication via switch fabrics. More specifically, the present invention relates to extending fat tree networks into a third dimension and adding mechanisms to PCIe switches so that they may operate as part of these extended fat tree networks.

2. Description of the Related Art

The fat tree network, is a universal network for provably efficient communications. Unlike an ordinary computer scientist's notion of a tree, which has "skinny" links all over, the links in a fat-tree become "fatter" as one moves up the tree towards the root. A Clos network can be seen to be a fat tree when it is drawn in a folded fashion. Fat tree networks, including Clos networks, are an efficient means (in terms of the number of switches required) of providing non-blocking communications among large numbers of nodes. A Clos network can also be extended to additional stages, retaining its optimality and non-blocking ability. Fat trees are used because they can be made non-blocking and because they are efficient. The 3 stage folded Clos network can be extended to 5 stages to form the well known Benes network, and a 5-stage Benes network may be extended to a 7-stage Cantor network, retaining the fat tree properties.

Clos networks have three stages: the ingress stage, middle stage, and the egress stage. Each stage is made up of a number of switches. Each communication entering an ingress switch can be routed through any of the available middle stage switches, to the relevant egress switch. A middle stage switch is available for a particular new communication if both the link connecting the ingress switch to the middle stage switch, and the link connecting the middle stage switch to the egress switch, are free.

FIG. 1 depicts an example Clos network. This is a simple example of a non-blocking 3-stage switch fabric, but the principles illustrated work for Clos networks and other fat tree networks composed of any numbers of ports and switches.

The Peripheral Component Interface (PCI) was a communication standard utilizing parallel busses to connect devices in a computer system topology. While it was extremely popular in its day, it has largely been supplanted by the newer PCI Express (PCIe) standard, which replaces the parallel bus system with a serial, point-to-point scheme.

PCIe switches can be implemented in a Clos network configuration. Some problems with such a configuration, however, are that PCIe switch fabrics are limited in scalability by the size of the PCIe 8-bit BUS name space and they are limited in their ability to spread traffic evenly over redundant links by address and ID routing rules and producer-consumer ordering rules.

What is needed is a solution that does not suffer from these drawbacks.

SUMMARY OF THE INVENTION

In a first embodiment of the present invention, a non-blocking switch fabric is provided comprising: a first set of intra-domain switches; a second set of intra-domain switches; a set of inter-domain switches located centrally between the first set of intra-domain switches and the second set of intra-domain switches, wherein each of the ports of each of the inter-domain switches is connected to an intra-domain switch from the first or second set of intra-domain switches.

In a second embodiment of the present invention, a method for operating an intra-domain switch in a first set of intra-domain switches in a non-blocking switch fabric having the first set of intra-domain switches, a second set of intra-domain switches, and a set of inter-domain switches located between the first set of intra-domain switches and the second set of intra-domain switches is provided, the method comprising: at an outside edge port of the intra-domain switch, inserting, in a packet that must travel between domains, an inter-domain routing prefix identifying both source and destination domains; and passing the packet that must travel between domains to one of the inter-domain switches via an inside edge port of the intra-domain switch.

In a third embodiment of the present invention, a non-transitory program storage device readable by a machine tangibly embodying a program of instructions executable by the machine is provided to perform a method for operating an intra-domain switch in a first set of intra-domain switches in a non-blocking switch fabric having the first set of intra-domain switches, a second set of intra-domain switches, and a set of inter-domain switches located between the first set of intra-domain switches and the second set of intra-domain switches, the method comprising: at an outside edge port of the intra-domain switch, inserting, in a packet that must travel between domains, an inter-domain routing prefix identifying both source and destination domains; and passing the packet that must travel between domains to one of the inter-domain switches via an inside edge port of the intra-domain switch.

In a fourth embodiment of the present invention, an apparatus operating an intra-domain switch in a first set of intra-domain switches in a non-blocking switch fabric having the first set of intra-domain switches, a second set of intra-domain switches, and a set of inter-domain switches located between the first set of intra-domain switches and the second set of intra-domain switches is provided, the apparatus comprising: means for, at an outside edge port of the intra-domain switch, inserting, in a packet that must travel between domains, an inter-domain routing prefix identifying both source and destination domains; and means for passing the packet that must travel between domains to one of the inter-domain switches via an inside edge port of the intra-domain switch.

BRIEF DESCRIPTION OF THE DRAWINGS

FIG. 3 is a chart indicating Clos network configurations of 96 lane switches appropriate for use directly as Inter-domain switches or for split for use as Intra-domain switches in a SuperClos network configuration.

FIG. 4 shows two charts illustrating the scalability of SuperClos networks of 5 and 7 stage networks of 96 lane switches.

FIG. 9 is an example of ID routing and Inter-domain routing prefixes compatible with a SuperClos fabric.

DETAILED DESCRIPTION OF SPECIFIC EMBODIMENTS

Figure 1:
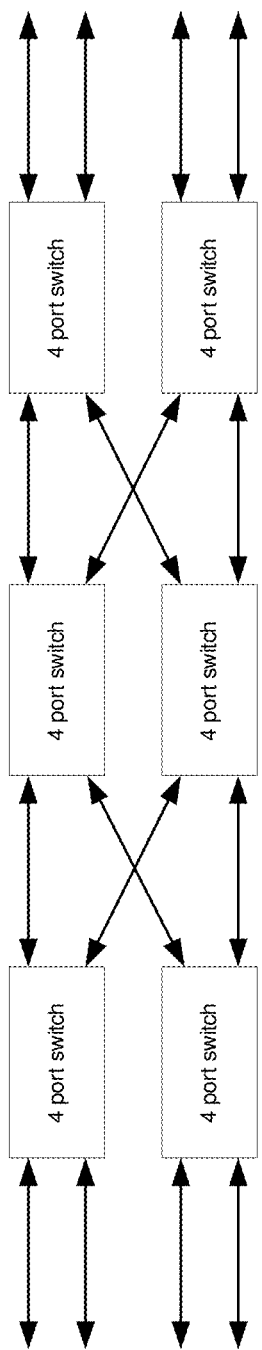
FIG. 1 depicts an example Clos network. This is a simple example of a non-blocking 3-stage switch fabric, but the principles illustrated work for Clos networks composed of any numbers of ports and switches.

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, a new switch fabric topology is utilized that allows the BUS number space limit to be overcome by introducing a third dimension in which routing between address and ID space domains takes place. This new topology can be called a "SuperClos" network. These topologies can also be derived from Benes and Cantor networks. These networks are created by adding switch ranks to a fat network. SuperClos fabrics provide the ability to scale to very large numbers of PCIe nodes with strictly non-blocking performance.

All fat tree networks have the property that the central rank of switches, the root of the fat tree, may be reached by routing obliviously to the final destination towards the central rank of switches, because any end node of the network may be reached from any point on that central rank of switches. In an embodiment of the present invention, the central rank of switches is split apart to insert a set of switches that route in a third dimension, both physically and logically. This divides the super-fabric into a set of independent domains within which the standard, 2-dimensional routing rules apply, connected by a set of inter-domain switches that enable routing in a third dimension, between domains. The orthogonality of this routing step makes it easy to extend existing switch fabrics and protocols to route in the third dimension. In extended PCIe fabrics, each domain is a separate BUS number and address space.

Figure 2:
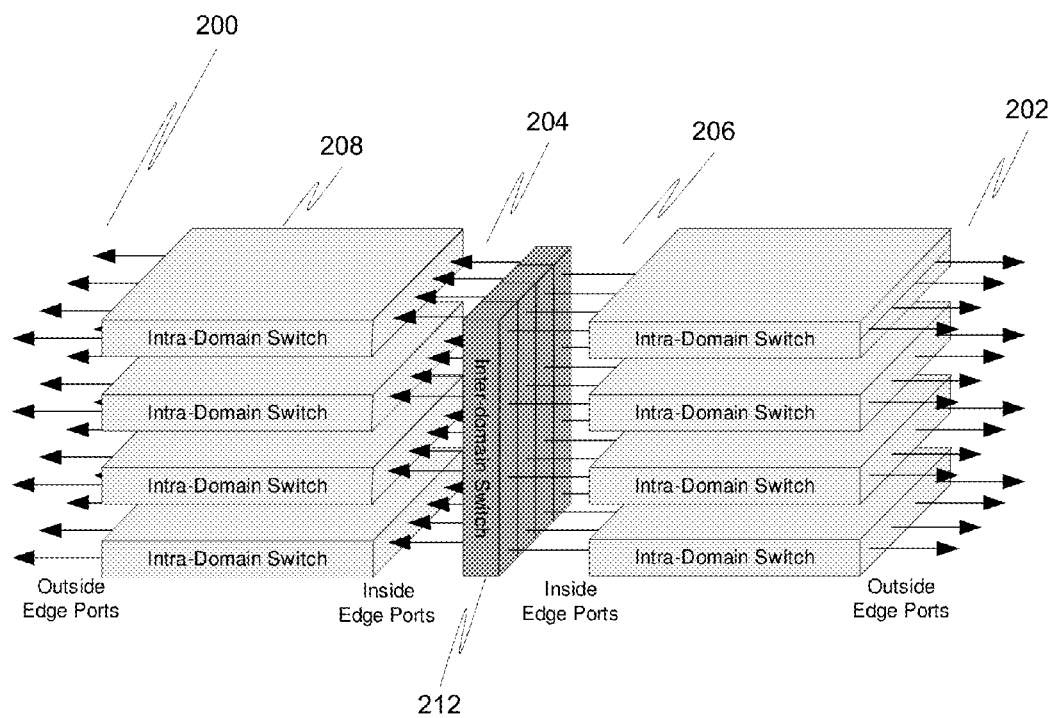
FIG. 2 is a diagram depicting a high level view of a Super-Clos switch fabric in accordance with an embodiment of the present invention.

FIG. 2 is a diagram depicting a high level view of a SuperClos switch fabric in accordance with an embodiment of the present invention. Servers and I/O adapters are connected to outside edge ports 200, 202. To maintain non-blocking throughput through the Inter-domain switches, an equal number of inside edge ports 204, 206 from the Intra-domain switches 208, 210 connect to the Inter-domain switches 212, with one port from each Intra-domain switch 208, 210 being connected to one port on each Inter-domain switch 212. Inter-domain bandwidth can be scaled back to reduce costs by reducing the number and/or width of Inter-domain switch ports.

A PCIe system comprising thousands of servers may be interconnected by a three dimensional PCIe fat tree with the appropriate routing extensions. Each domain in such a system could comprise a rack of server blades interconnected by a top of rack switch that has ports for both servers within the rack and for connections to the Inter-domain switches for communications with other racks. Such a system may be scaled large enough to encompass the largest enterprise server cloud or to implement a high performance cluster (HPC) super computer cluster.

Servers can be interfaced to the fabric via a non-transparent bridge and DMA controller for each server, preferably integrated into the switch chips at the outside edge ports of the intra-domain switches. Each domain is an independent global space created by non-transparent bridging in the edge switch ports.

In order to create such fabrics, PCIe switch chips may be created with routing extensions for providing non-blocking performance in the fat tree networks and for routing between domains. Taking advantage of a non-blocking multi-stage switch topology such as a fat tree requires routing methods that spread the traffic load more or less evenly over redundant paths through the fabric towards the root of the fat tree. In PCIe, producer-consumer ordering rules must be obeyed so some of the traffic must be routed deterministically. In an embodiment of the present invention, a load balancing routing mechanism is added that provides the desired balance even when only a fraction of the traffic may be routed obliviously.

In order to route between domains, a vendor defined prefix called an inter-domain routing prefix, containing both source and destination domain ID fields, can be inserted by the extended switches (or by servers that incorporate the extensions) in front of the headers of packets that cross between domains and in the descriptors and completion messages used by DMAC controllers to send messages through the fabric, in accordance with the PCIe standard. In non-transparent bridges, the inter-domain routing prefix is added to packets as part of the address translation step. When a read request is received from a foreign domain, the non-transparent bridge at the destination that receives it saves the source domain ID when it sends the read request into the request's destination domain and then inserts it as the destination domain in the inter-domain routing prefix of the returning read completion. Routing mechanisms are then added switches to spread traffic evenly over redundant paths while respecting PCIe ordering rules. Finally, at the center stage of the fabric, table look-up routing in the third dimension based on destination domain ID may be performed.

The inter-domain routing prefix may include a "destination domain has fault" bit that allows route exceptions to be made as necessary to avoid a small number of faults in the fabric.

As can be seen in FIG. 2, the network may be scaled to a higher port count by increasing the size of either intra-domain or inter-domain switches. FIG. 3 is a chart indicating Clos network configurations of 96 lane switches appropriate for use directly as Inter-domain switches or for split for use as Intra-domain switches in a SuperClos network configuration.

FIG. 4 shows two charts illustrating the scalability of SuperClos networks of 5 and 7 stage networks of 96 lane switches. A 5-stage fabric can join domains using a single switch for each inside edge domain switch port. 5-stage fabrics can be assembled with up to 3456×4 ports, 1728×8 ports, or 864×16 ports. 7-stage fabrics are created by replacing each of those single-chip Inter-domain switches with a Clos network. More than an order of magnitude higher port count is available with a 7-stage fabric. Even higher scalability is possible using higher order networks. A 9-stage fabric results from inserting a Clos network between the halves of a split 5-stage Benes network. An 11-stage fabric results from inserting a Clos network between the halves of a split Cantor network. Even higher order fabrics can be developed using Benes or Cantor networks for the Inter-domain switches. For each two stages of switches added to a fabric using 24 port 96-lane switches, the maximum size fabric increases by a factor of 6.

As described above, the extension into the third dimension can be made for any number of switch topologies, including higher order switch topologies such as a 5-stage Benes network that contains multiple Clos networks embedded within its two outer columns of switches or a 7-stage Cantor network that contains multiple embedded Benes networks. The present invention can, in fact, be used with any switch topology that has the property that all paths leading from an outer edge switch port towards a switch in the center column are equivalent in that from that center column, any outer edge switch port can be reached.

Figure 5:
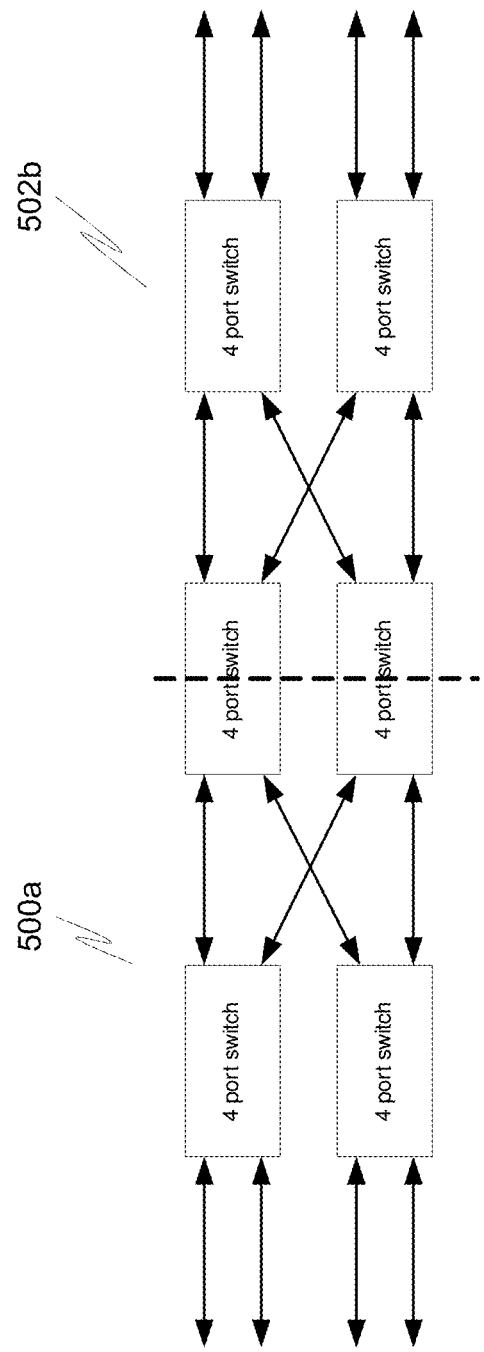
FIG. 5 is a diagram illustrating a folded Clos network illustrating where the fabric will be split to create a multi-domain fabric.

The multi-domain fabric topology of an embodiment of the present invention can be created by splitting a network in half at a line drawn vertically through the center of its central column of switches. This is depicted in FIG. 5. FIG. 5 is a diagram illustrating a folded Clos network illustrating where the fabric will be split to create a multi-domain fabric.

Figure 6:
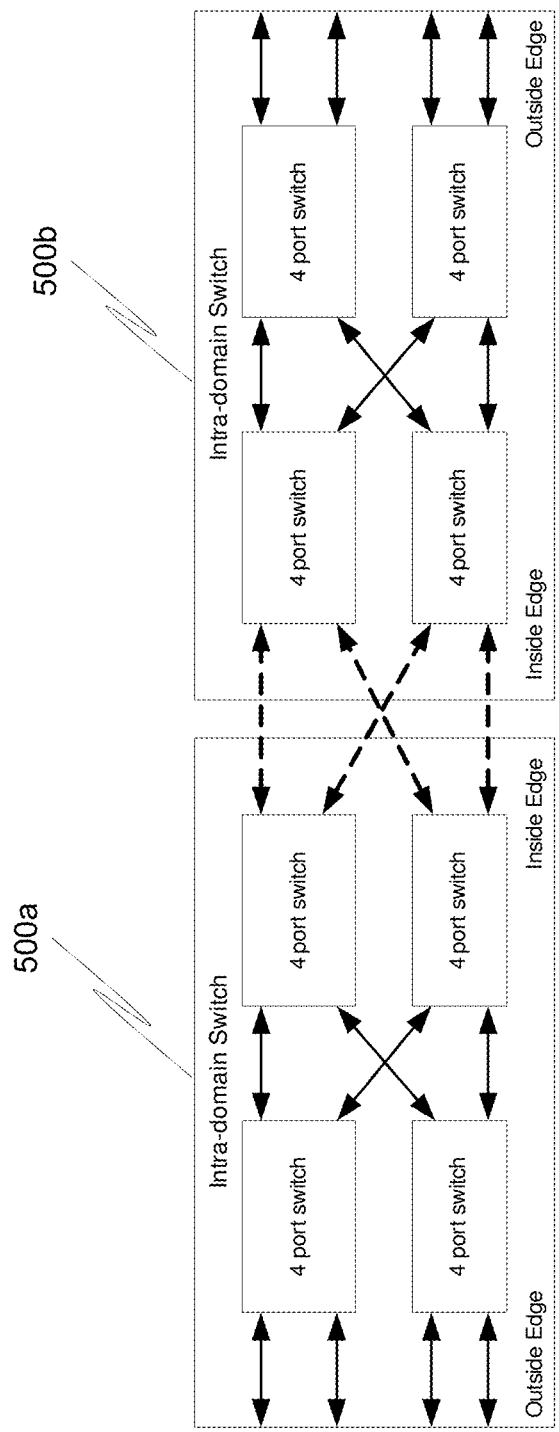
FIG. 6 is a diagram illustrating the fabric of FIG. 5 split into two parts to allow inter-domain switches to be inserted into the connections between the two parts in order to create a multiple domain topology in accordance with an embodiment of the present invention.

Each half network 500a, 500b resulting from the split is expanded to two columns of switches. This is depicted in FIG. 6. FIG. 6 is a diagram illustrating the fabric of FIG. 5 split into two parts to allow inter-domain switches to be inserted into the connections between the two parts in order to create a multiple domain topology in accordance with an embodiment of the present invention. Each of the subnetworks 500a, 500b thus created is a domain. The switch fabric that interconnects the switches can be called an intra-domain switch. Domains have Outside Edge switch ports that would connect to servers in a clustering or HPC application and inside edge switch ports that lead to other domains. The switch fabric of FIG. 6 functions the same as a Clos network except for the delay of an added switch stage, and thus it is non-blocking. It remains non-blocking when a non-blocking switch or switch fabric is inserted in each of the inter-domain links, as is done to create a SuperClos network.

Figure 7:
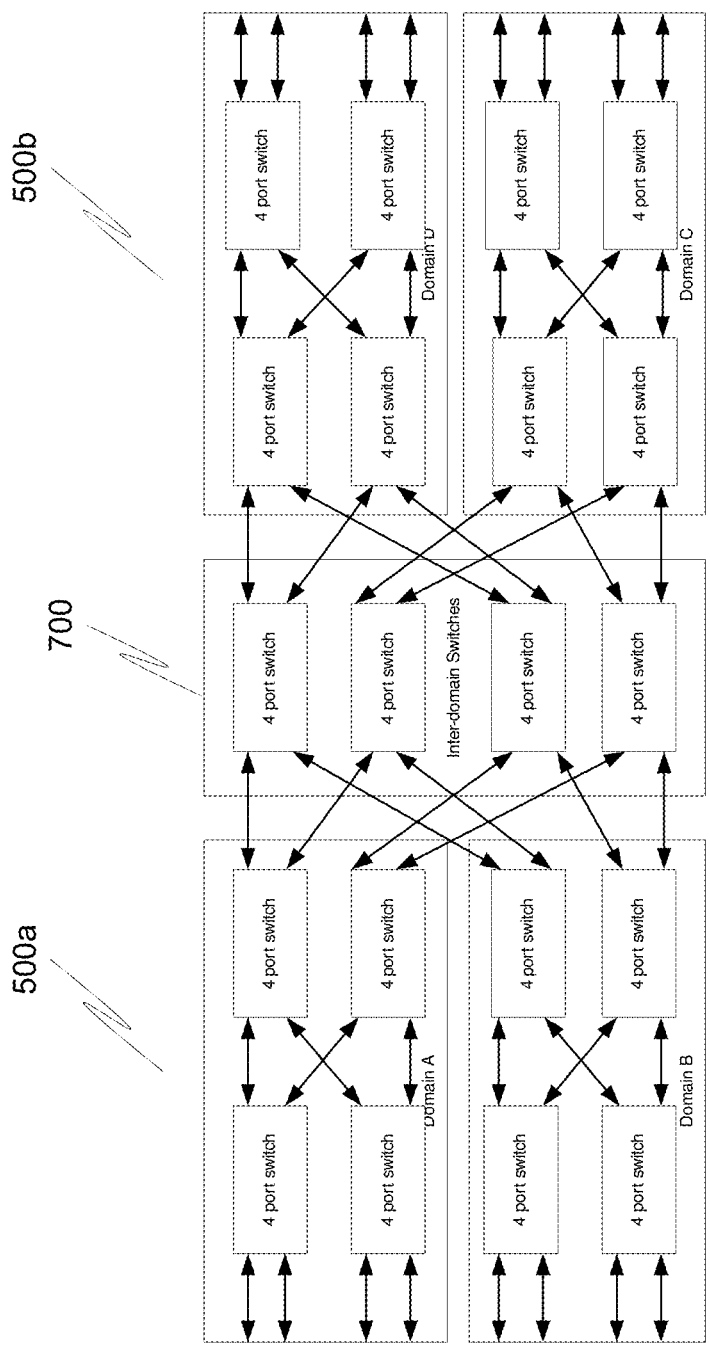
FIG. 7 is a diagram illustrating a multiple domain topology including four 4-port inter-domain switches used to connect four domains where each domain comprises one of the split halves of a folded Clos network illustrating in FIG. 6, in accordance with an embodiment of the present invention.

The third routing dimension is created by inserting a switch or a switch fabric in each of the links between domains and connecting additional domains at its ports. FIG. 7 is a diagram illustrating a multiple domain topology including four 4-port inter-domain switches used to connect four domains where each domain comprises one of the split halves of a folded Clos network illustrating in FIG. 6, in accordance with an embodiment of the present invention. Here, an intra-domain switch 700 has been added between half network 500a and half network 500b. It should be understood that interdomain switches of any number of ports can be utilized including switches comprised of multiple switch chips that might themselves be interconnected to form a fat tree.

Figure 8:
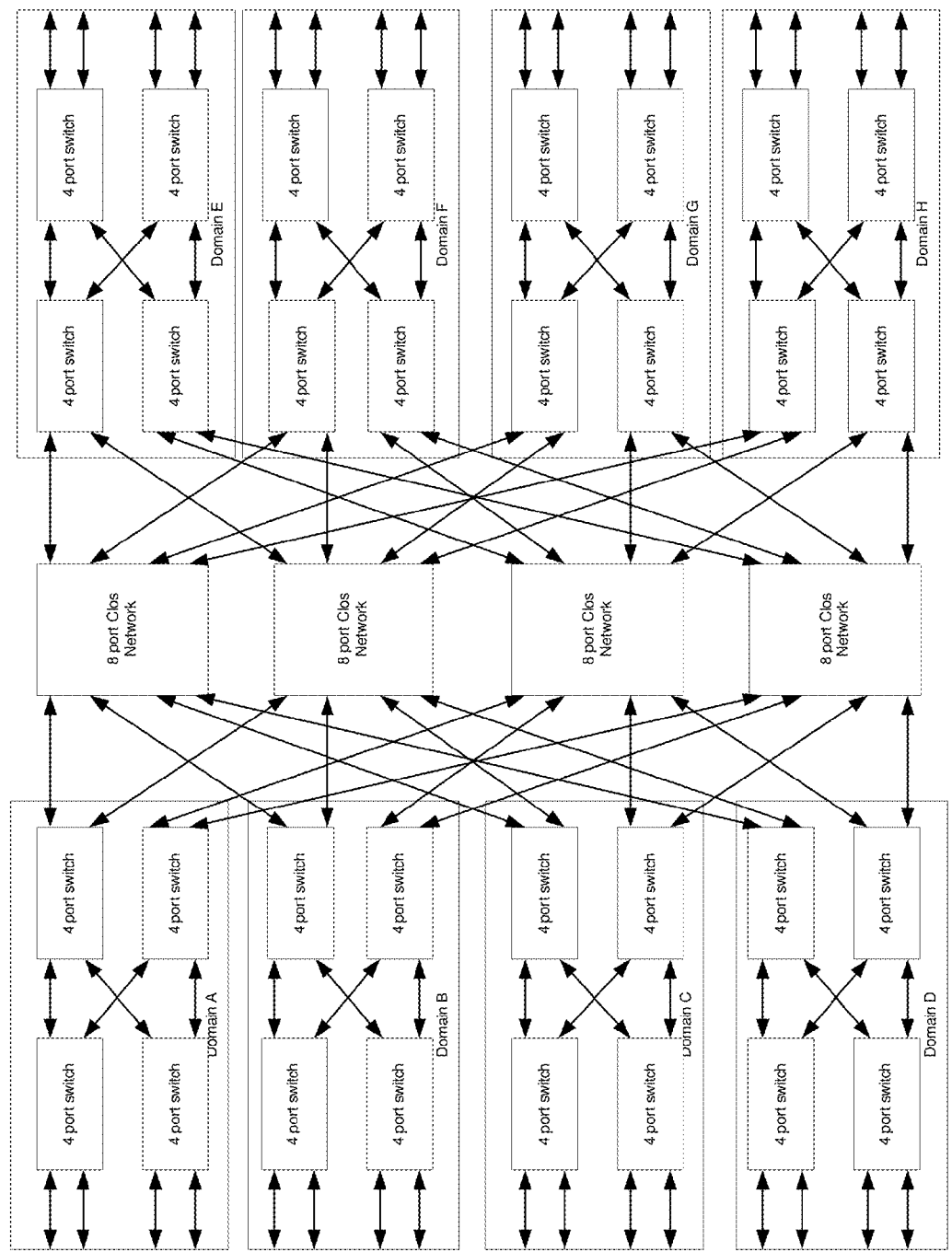
FIG. 8 is a diagram illustrating a more complex SuperClos network in accordance with another embodiment of the present invention.

FIG. 8 is a diagram illustrating a more complex SuperClos network in accordance with another embodiment of the present invention. Here, each inter-domain switch of FIG. 7 has been replaced by the 8-port Clos network of FIG. 4 to allow the SuperClos network to scale to 8 domains for a total of 32 ports.

Turning now to routing, typical Clos networks involves source and destination outer edge fabric ports being in the same domain. Routing in a SuperClos network entails the additional step of routing between source and destination domains.

When a packet is received in the ingress of an outer edge fabric port and its destination outer edge port is determined to be on the same switch, it is forwarded directly to that destination port. Otherwise, it may be forwarded onto one of the redundant paths leading into the fabric, using a spread routing mechanism that attempts to divide the traffic load evenly over all such paths while retaining ordering within each {Source ID, Destination ID, traffic Class} stream. The spread routing mechanism is called deficit round robin routing and will be described in more detail later. Deficit round robin routing uses deterministic routing for ordered traffic.

At every subsequent fabric stage, if Source and Destination Domain IDs are the same, standard 2 dimensional routing rules (address and/or ID routing in PCIe) are applied to determine if the destination end node can be reached by forwarding the packet onto a path leading away from the root of the fat tree. If so, the packet is forwarded out the port that marks the start of that path. If not, spread routing is used to select one of the redundant paths leading deeper into the fabric and the packet is forwarded out the corresponding port.

This process is continued until the ingress of an Inter-domain switch is reached. Note that in Inter-domain switch may be a single switch chip or a multiple chips connected as a fabric. In any portion of an Inter-domain switch fabric, routing is performed by table look-up using the Destination domain ID as the table index. If the inter-domain switch is a single switch, or if it is a multiple stage switch network and the destination domain is reached by a port on the same switch in which the packet is received, the packet is routed to its destination domain in a single step. If not, the packet is spread routed towards the center stage of the inter-domain switch fabric. At each subsequent stage until the ingress of a switch in the destination domain is reached, the destination domain table look-up process is repeated. If the destination domain can be reached by forwarding the packet more than one path that leads away from the center stage, then the look-up table entry specifies that the packet is to be forwarded out a port selected via the spread routing mechanism.

Once the packet enters the ingress of an intra-domain switch in the destination domain, the domain ID of each switch matches the destination domain ID in the packet header and therefore standard address or ID routing mechanisms can be used until the packet reaches its destination outer edge port.

Each domain is a separate horizontal plane that connects to other domains only through the central inter-domain switches or switch fabrics. Each domain is an independent PCIe address and ID (bus number) space. Servers may be connected to any outer edge port of a domain through a non-transparent bridge and/or DMA controller that implements support for the inter-domain ID routing prefix. An I/O adapter may also be connected to any outer edge port of a domain and even to an inside edge port, if the switch routing tables and registers are configured appropriately. If the adapter doesn't support the Inter-domain routing prefix, then it may be limited to communicating only with nodes in the same domain.

Each outside edge port of each intra-domain switch of a SuperClos network can include the means to interface to a server with an independent address space and to isolate that address space from the domain's address and ID space. This can be accomplished using non-transparent bridging and also with the use of a DMA controller and vendor-defined prefixes to standard PCIe packets. Mechanisms in these modules add what may be called a vendor-defined inter-domain routing prefix to packets that must cross between domains and remove the prefix when the packet reaches its destination outer edge fabric port. When a DMA controller is used to create message sent through the fabric, the source and destination domain ID fields should be included in DMA descriptors and completion queue entries as well as in this prefix.

When a read request is sent between domains through the fabric, then the source domain ID in its header or routing prefix should be saved (typically in the requester ID translation look-up table of the destination's non-transparent bridge) and used as a destination domain in the domain ID that the non-transparent bridge attached to the returning completion.

The non-transparent bridge logic functionality may be extended to either add or remove an inter-domain routing prefix by including address look-up table based address translation mechanisms for memory request packets passing through it towards the fabric. In order to support inter-domain communications, the following may be performed:

1. Add a destination domain field to the outgoing A-Lookup table (A-LUT) entry of the source non-transparent bridge.
2. Attach an inter-domain routing prefix to packets routed outbound through an A-LUT if the destination domain field of the entry in which the packet's address hits is different than the domain ID of the switch itself.
3. Use one bit in this prefix to differentiate the A-LUT space read or write from a DMA pull mode remote read.
4. Spread-route packets with this prefix towards the center column of the fabric.
5. Route the packet into its destination address domain via an Inter-domain switch.
6. Address route the packet, ignoring the prefix, from the inner domain edge port to its destination outer edge port.
7. If the packet is a read request or other non-posted request, then save the source domain ID from the packet's prefix for use in creating a prefix to return route the returning completion.
8. Drop the prefix.
9. Forward the packet out the outer edge switch port.

Turning now to deficit round robin spread routing, this mechanism may apply to any fabric that has multiple paths over which it is necessary or desirable to divide the traffic so as to equalize the utilization of each path while providing deterministic routing for a subset of the traffic. As described earlier, it may be used to select among a set of output ports from any of which the destination may be reached. Spread routing need only be used on that part of a packet's path through a fat tree or SuperClos fabric that leads towards its central rank of switches.

Routing takes place in the ingress of switch ports where packet headers are inspected and packet type and destination are determined. Each packet is first classified as to whether or not it is part of an ordered stream according to the rules implemented in the fabric. Ordered streams can be identified by traffic class and source and destination ID fields in the packet header, again according to rules implemented in the fabric. A hashing operation may be performed on the concatenated traffic class and Source and Destination IDs to create a table index. The egress port is then looked up in what is called a spreading table using the result of the hash as a table index. The ordered packet is then forwarded out the switch port directed by the table entry (unless an exception must be taken because of the presence of a fault somewhere in the fabric). The above procedure provides for deterministic routing for ordered packets such that all packets in the same source-originated stream take the same path towards the central rank of switches.

Spreading table entries can be configured to divide the ordered traffic among the available paths. If the bandwidths of individual streams are known, then it may be possible to create custom table entries that result in equal division of the traffic over the paths. A simpler way to spread the ordered traffic that does not require knowledge of individual stream bandwidth is to divide its stream ID hash result by the number of ports over which the traffic is being spread and then forward the packet to the port whose port number equals or is associated with the remainder from the division. This modulo division operation may be implemented by table look-up—in the spreading table.

Whatever rule is used to create the table entries, there will be some imbalance in the resulting distribution of ordered traffic. This imbalance will result in longer queues at the switch ports that are more highly utilized and may ultimately limit performance or lead to blocking. In the prior art, adaptive routing mechanisms have been used that send each unordered packet the port associated with a path down which the least queuing exists. These methods have required exchange of queue depth information between switch stages, are complex to implement, and can add latency to the routing decision.

The new deficit round robin routing method presented here improves on so called adaptive routing by attempting to correct the traffic distribution imbalance before the differential queue depth acted upon by adaptive routing can develop. It performs this measuring of the port utilization directly and then forwards unordered packets to the currently least utilized port—the one in deficit. In the steady state case when balance has been achieved a round robin pattern occurs as each port over which traffic is being spread cyclically experiences a deficit. The result is that the imbalance is very quickly corrected, resulting in minimal queuing and consequently lower latency.

There are many ways to measure utilization of an output port. An embodiment of the present invention works best when there is the least delay in this measurement process. The minimum delay can be achieved when each packet is predictively counted towards the utilization as soon as its egress port is determined.

Implementation can be simplified when each port, or group of ports sharing an ingress data path such as those in the same station module of a switch, spreads its traffic independently of other ports or groups of ports. This avoids the complexities of coordinating decisions and sharing information among ports.

Each station maintains a running total in an accumulator for each port over which traffic is being spread that measures the imbalance in the length of packets forwarded to the ports. The set of accumulators is designed to operate according to the following rules:

1. The accumulators saturate at 0 and all 1's. They are inhibited from counting down below zero or rolling over to zero at the all 1's state.

2. A comparator tree performs a set of pairwise comparisons of all counters to determine the lowest accumulated value and the port associated with it.

3. When a packet is forwarded to a port, either that port's count is increased by a value proportional to its length or all other ports are decreased by that same length proportional value. The latter is done if the value is greater than the minimum accumulated value found by the comparators or if the port's accumulator is already saturated at all 1s. Accumulated values that receive a decrement greater than the current values, are set to zero.

4. For each packet passing through the ingress, if the packet is an ordered packet it is forwarded to the port directed by the port selection table. If the packet is unordered, it is forwarded to the port with the minimum accumulator value.

Unordered packets commonly include completion packets. It may be possible that certain read requests are also unordered, but this is rare. For the most part, all requests are ordered.

The modulus of the counters and the precision of the length proportional value can be determined primarily by the distribution of packet types and lengths. In the intended applications on extended PCIe switch fabrics, the traffic has a maximum payload length of 256 bytes, with most packets limited to 128 bytes of payload. Header plus DLL and PLL overhead ranges from 28 to 36 bytes. Little accuracy is lost if the length proportional value is the TLP length in bytes plus 8 for DLL content and framing divided by 32 and any errors made will tend to average out. Since the maximum packet length is 292 bytes, the accumulators must handle a 4-bit increment or decrement. 8-bit accumulators allow 32 256-byte packets in a row to be sent to the same port without saturating its accumulator. Further economies can be realized by ignoring the 3LSBs of the accumulated values when comparing them to locate the minimum.

The rankings degrade gracefully if accumulators saturate. A full line rate ordered stream can cause all the traffic to be sent out a single port for as long as the flow persists. That port's accumulator will saturate at all 1s and later all the other port's accumulators will saturate at zero. When the stream finally ends and a more normal flow resumes, all other ports" accumulators will be at zero and any one can be chosen. Rankings then begin to accumulate again, with the saturated ports not receiving any packets until its decreasing accumulated value comes down to match the rising values of the other ports. This is exactly the desired behavior.

After the egress port is determined, the packet is placed in what may be called a destination queue for that port. If there is no backlog it is transmitted immediately. Typically, a small queue exists at each egress port that waxes and wanes as the round-robin spreading from each of the several ingress ports feeding the queues fall into and out of alignment. In exceptional cases, such as the presence of congestion or a fault downstream, a destination queue will exceed the expected value based only on the operation of the spreading algorithm. To provide an ability to adapt to faults and congestion, each port's destination queue depth is compared to a configurable threshold. When the depth is over the threshold value, the round-robin spreader doesn't send it any packets.

In a fabric comprised of multiple switch chips, especially in ones with cabled interconnections between switches, it is beneficial to be able to avoid paths through a fabric that includes a fabric fault such as a broken link or unplugged cable. In a SuperClos fabric, standard PCIe mechanisms provide for the notification of a management processor when a fabric link goes up or down for any reason. The management processor can then reconfigure routing mechanisms within the fabric to avoid the need to traverse a link that is down or to restore normal routing when a previously broken link becomes operational.

A first and obvious fault avoidance routing step is to avoid routing onto a failed/faulty link when one is encountered on the path towards the center of a Clos/fat tree network. If the packet is part of an ordered stream, then some other path that leads to the destination is chosen by use of a simple, consistent rule such as "take the next higher numbered port that also leads to the same destination." If the packet is unordered, then the spread routing mechanism simply doesn't consider it one of the possible choices.

This rule alone may be insufficient. Traffic can also be rerouted on the path towards the center of the array so that it will not encounter the failed link on its return, address/ID routed, path away from the center towards its destination end node. Therefore, when a fault is known to be present in the destination domain, a route exception look-up is made at each routing step leading towards the root of the fat tree. A "This Domain Has Fault" state bit maintained by the management processor indicates if a fault is present in the home domain. The BUS number of the destination global RID of the packet being routed is indexed into a route exception table. The table returns the port number(s) of the port(s) that must not be selected by the spread routing mechanism. The spread routing mechanism is inhibited from choosing this/these port(s)f or unordered traffic. If the configured path for ordered traffic leads through one of the ports identified by a route exception lookup, then the packet is, as before, sent onto the next higher numbered port leading to the same destination.

The route exception lookup can be implemented to return one or more prohibited port numbers, each beyond the first representing an additional fabric fault for which route exceptions can be made. In one embodiment of the present invention in a 24-port switch, the route exception lookup returns a 12-bit bit vector where each bit represents an egress port for which a route exception must be taken. In the general case of a fabric with constant cross-sectional bandwidth, the bit vector should be wide enough to accommodate half of the ports of the switch because half will lead towards and half will lead away from the root of the fat tree.

The simple scheme of performing a route exception lookup for avoiding faults in a two-dimensional fabric increases in complexity when applied to three dimensional routing. Here, it may be necessary for the route through a source domain to comprehend faults in the destination domain, otherwise the spread-routing could bring a packet into a domain on a port from which the destination end node cannot be reached due to a fault.

Rather than expanding the fault exception lookup index from 8-bits of bus to 16-bits of (domain, bus), a simplification can be made due to the fact that only a very small number of faults will be present at any one time. Here, each packet that crosses between domains can be tagged with a bit that says "destination domain has fault" and route exceptions may be performed based on the route exception lookup mechanism previously described whenever this bit is true. If there is only a single fault in the entire fabric, then this simplification causes no penalties. If there are two faults present, then when targeting a domain that contains a fault, two paths will be excluded instead of one. This is a small cost in a large fabric. Thus, this mechanism gracefully degrades as the number of faults present increases.

A failed or faulty link may exist within an Inter-domain switch or in the cables between one of these switches and an Intra-domain switch. Route exceptions for these faults may be made at the edge of the source domain. If a path through an inter-domain switch contains a fault then the inside edge port of the source domain switch that connects to the inter-domain switch may be prohibited from being selected by the spread routing mechanism. The inside edge switches of each source domain are configured with status bits for each egress port connecting to an inter-domain switch. If that switch or the links to it contain a fault, then a route exception lookup is performed using the destination domain (instead of the destination global bus number). If a route exception is indicated, then for ordered traffic, the next higher numbered port with good status is selected and, for unordered traffic, all ports with "bad" status are excluded from the deficit round robin route choices and the packet is forwarded to any of the remaining ports that connect to inter-domain switches.

FIG. 9 is an example of ID routing and Inter-domain routing prefixes compatible with a SuperClos fabric.

Figure 10:
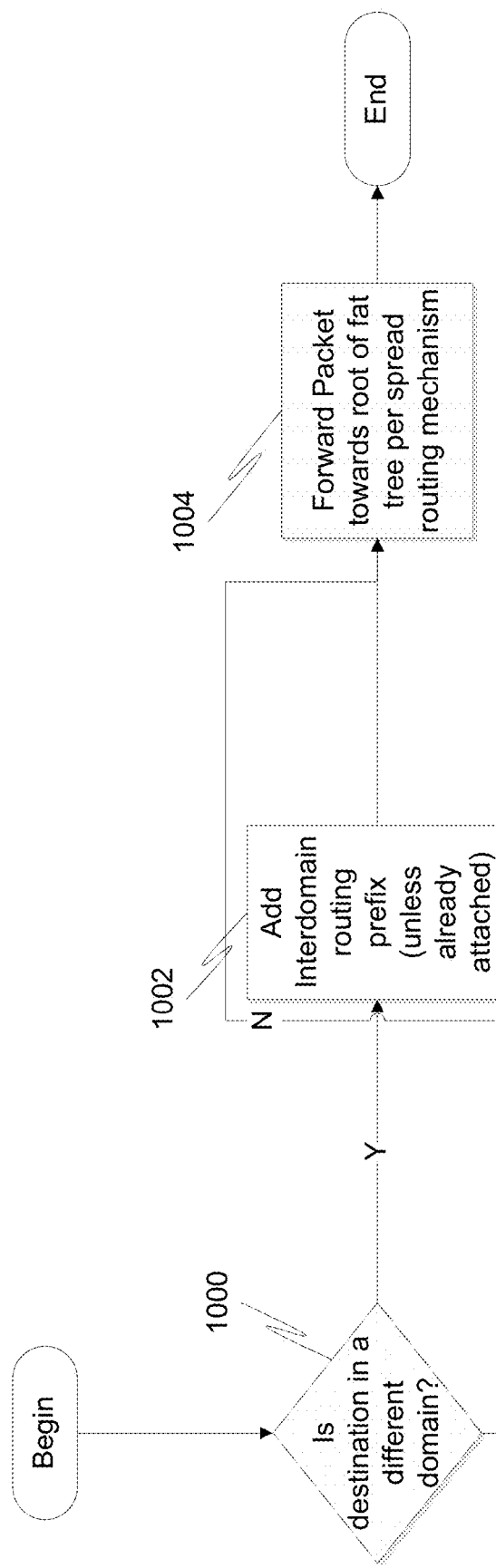
FIG. 10 is a flow diagram illustrating a method for inserting an interdomain routing prefix into a packet in accordance with an embodiment of the present invention.

FIG. 10 is a flow diagram illustrating a method for inserting an interdomain routing prefix into a packet in accordance with an embodiment of the present invention. This method may be performed at a source or the source's switch. Here, at 1000, it is determined if the destination of an incoming packet is in a different domain. If so, then at 1002, an inter-domain routing prefix is added (unless it is already attached). Then at 1004 an inter-domain routing the packet is forwarded towards the root of the fat tree per a spread routing mechanism. If at 1000, the destination of the packet is not in a different domain, then step 1002 is skipped.

Figure 11:
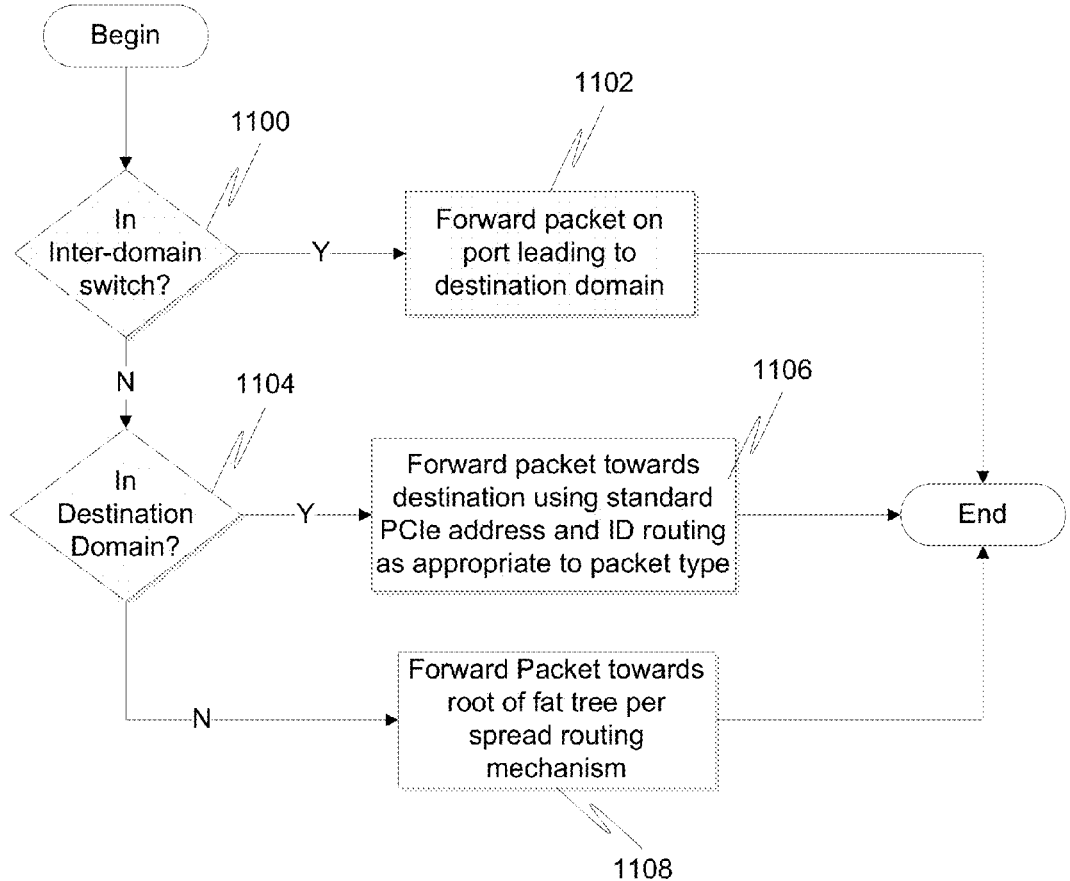
FIG. 11 is a flow diagram illustrating a method for performing spread routing in accordance with an embodiment of the present invention.

FIG. 11 is a flow diagram illustrating a method for performing spread routing in accordance with an embodiment of the present invention. This method may be performed at all switches until the destination port of the destination switch is reached. At 1100, it is determined if the current location is in an inter-domain switch. If so, then at 1102 an incoming packet is forwarded to a port leading to a destination domain of the packet (via table lookup using Destination Domain as the table index). If at 1100 it is determined that the current location is not an inter-domain switch, then at 1104 it is determined if the current location is in a destination domain. If so, then at 1106 an incoming packet is forwarded towards a destination using standard PCIe address and ID routing, as appropriate for the packet type. If not, then at 1108, an incoming packet is forwarded towards the root of the fat tree per a spread routing mechanism.

Figure 12:
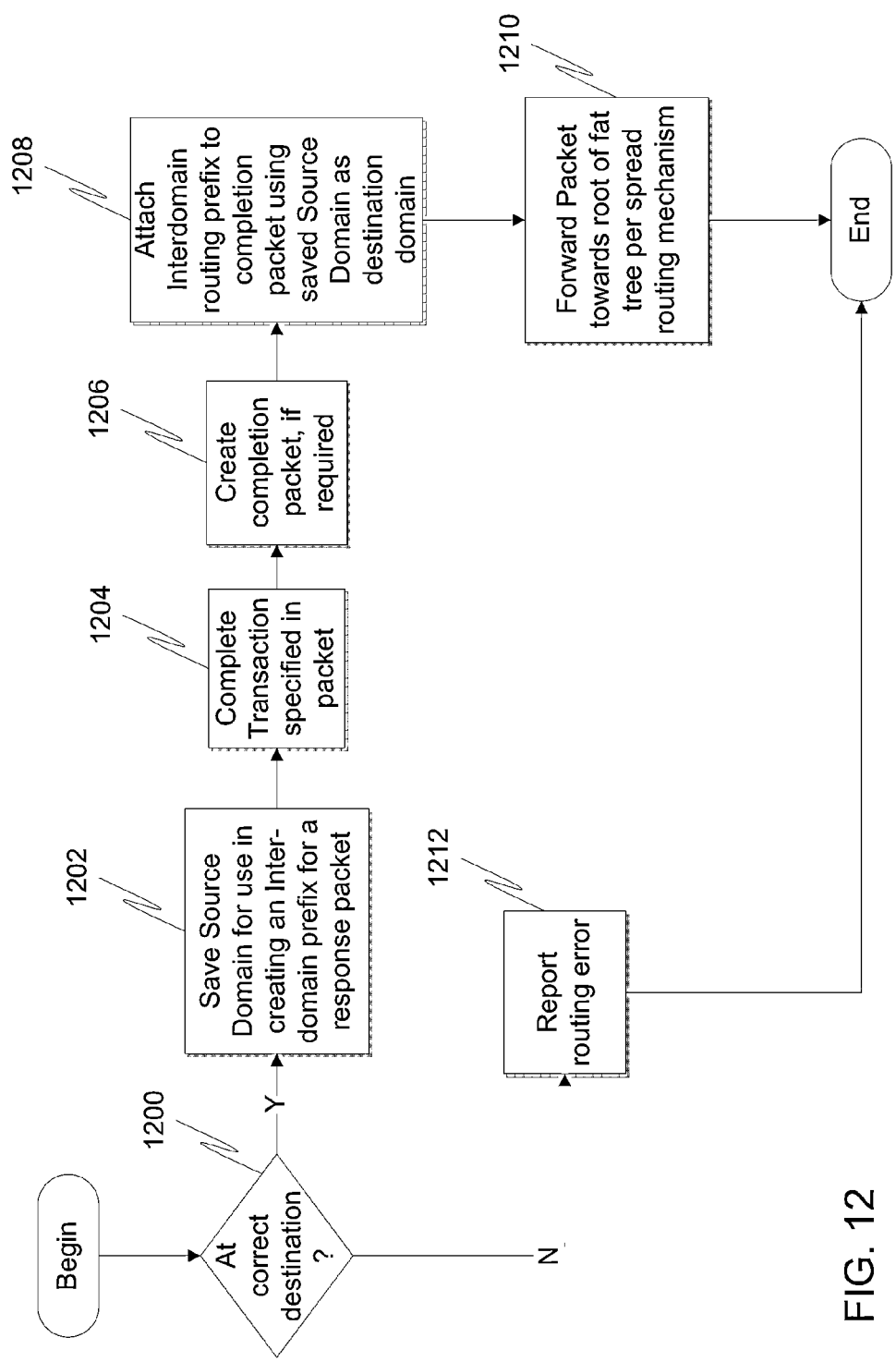
FIG. 12 is a flow diagram illustrating how the source domain id in an interdomain routing prefix is saved at the packets destination node and then used to create an interdomain routing prefix used to return a response packet to the original source in accordance with an embodiment of the present invention.

FIG. 12 is a flow diagram illustrating how the source domain id in an interdomain routing prefix is saved at the packets destination node and then used to create an interdomain routing prefix used to return a response packet to the original source in accordance with an embodiment of the present invention. This method may be performed at a destination port of a destination switch. At 1200, it is determined if a packet is at a correct destination. If so, then at 1202 the source domain of the packet is saved for use in creating an Inter-domain prefix for a response packet. At 1204, the transaction specified in the packet is completed. At 1206, a completion or other response packet is created, if required. Then, at 1208, the inter-domain routing prefix is attached to the completion packet using the saved source domain as the destination domain. Finally, at 1210, the packet is forwarded towards the root of the fat tree per the spread routing mechanism. If at 1200 it was determined that the packet was not at the correct destination, then at 1212 a routing error is reported.

Figure 13:
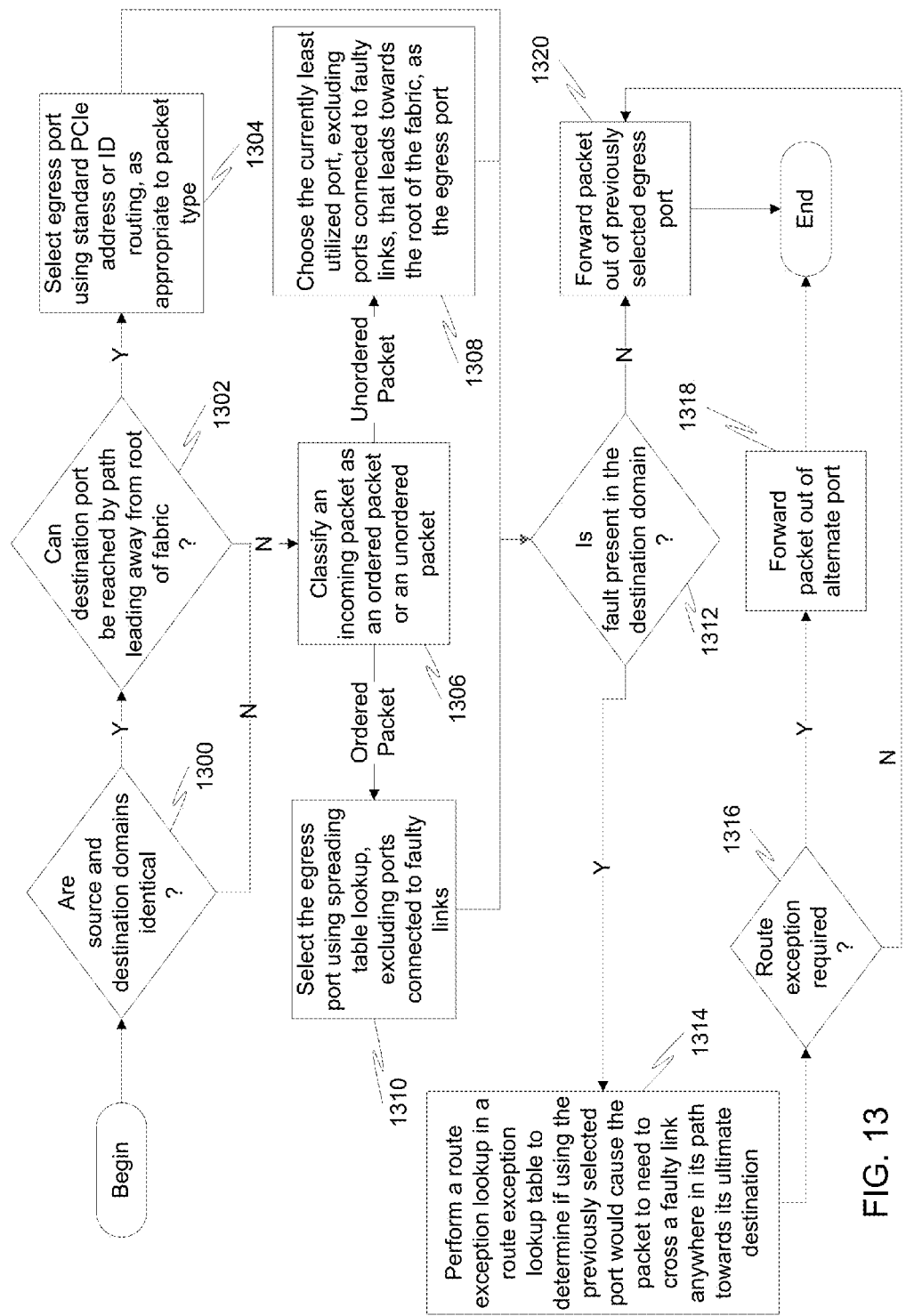
FIG. 13 is a flow diagram illustrating the spread routing mechanism, including fault exception routing, in accordance with an embodiment of the present invention.

FIG. 13 is a flow diagram illustrating the spread routing mechanism, including fault exception routing, in accordance with an embodiment of the present invention. At 1300, it is determined if source and destination domains are identical. If so, then at 1302 it is determined if the destination port can be reached by a path leading away from the root of the fabric. If so, then at 1304, an egress port is selected using standard PCIe address or ID routing, as appropriate to the packet type. If either the source and destination domains are not identical or the destination port cannot be reached by a path leading away from the root of the fabric, then at 1306 an incoming packet is classified as an ordered or an unordered packet. If it is unordered, then at 1308 the currently least utilized port, excluding ports connected to faulty links, that leads towards the root of the fabric, is chosen as the egress port. If the packet is ordered, then at 1310 the egress port is selected using a spreading table lookup, excluding ports connected to faulty links.

Once the egress port is selected using any means, then at 1312 it is determined if a fault is present in the destination domain. If so, then at 1314 a route exception lookup is performed in a route exception lookup table to determine if using the previously selected port would cause the packet to need to cross a faulty link anywhere in its path towards its ultimate destination. Then at 1316 it is determined if route exception is required. If so, then at 1318 the packet is forwarded out of an alternate port. If not, then at 1320 the packet is forwarded out of the previously selected egress port. Note that this step is also performed if it was determined at 1312 that a fault was present in the destination domain.

These figures together comprise a flow chart for operating a switch in a first set of intra-domain switches in a non-blocking switch fabric having the first set of intra-domain switches, a second set of intra-domain switches, and a set of inter-domain switches located between the first set of intra-domain switches and the second set of intra-domain switches in accordance with an embodiment of the present invention.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for operating an intra-domain switch in a first set of intra-domain switches in a non-blocking switch fabric having the first set of intra-domain switches, a second set of intra-domain switches, and a set of inter-domain switches located between the first set of intra-domain switches and the second set of intra-domain switches, the method comprising:
   at an outside edge port of the intra-domain switch, inserting, in a packet that must travel between domains, an inter-domain routing prefix identifying both the source and destination domains; and
   passing the packet that must travel between domains to one of the inter-domain switches via an inside edge port of the intra-domain switch, the method further comprising:
   classifying an incoming packet as an ordered packet or an unordered packet;
   for an ordered packet, forwarding the incoming packet to a port identified by a spread routing table using a hash of source and destination identifications as a table index; and
   for an unordered packet, forwarding the incoming packet to a currently least utilized port, that leads to a root of the non-blocking switch fabric, having a smallest accumulator value, wherein an accumulator value for a port is increased by a value proportional to a length of each packet being forwarded to that port.

2. The method of claim 1, further comprising:
   determining if the packet is a read request or other non-posted request;
   when the packet is a read request or other non-posted request, saving a source domain identification from a prefix of the packet for use in creating a prefix to return route an eventual returning completion for the packet.

3. The method of claim 2, further comprising:
   at the outside edge port of the intra-domain switch, removing, from a packet received via an intra-domain switch, an inter-domain routing prefix identifying both source and destination domains and saving the source domain to be used to route a response packet back to the original source port.

4. The method of claim 2, wherein the inserting is performed by non-transparent bridge logic functionality.

5. The method of claim 2, wherein the inserting is performed by a direct memory access (DMA) controller or other form of message passing engine.

6. The method of claim 1, wherein an unordered packet includes a completion packet.

7. The method of claim 2, further comprising:
   when a fault is known to be present in a destination domain, performing a route exception lookup in a route exception lookup table at each step leading towards a root of a switch fabric defined by the first set of intra-domain switches, second set of intra-domain switches, and set of inter-domain switches; and
   prohibiting the packet from being forwarded to a destination port identified in the route exception lookup table.

8. The method of claim 7, wherein the fault is known to be present by detecting a tag in the packet having a bit that indicates that the destination domain has a fault.

9. The method of claim 7, wherein inside edge switches of each source domain are configured with status bits for each egress port connecting to an inter-domain switch, and wherein if the inter-domain switch or the links to it contain a fault, a route exception lookup is performed using the destination domain.

10. The method of claim 9, wherein if a route exception is indicated by the lookup, then for ordered traffic, a next higher numbered port with good status is selected, and for unordered traffic, all ports with bad status are excluded from deficit round robin route choices.

11. A non-transitory program storage device readable by a machine tangibly embodying a program of instructions executable by the machine to perform a method for operating an intra-domain switch in a first set of intra-domain switches in a non-blocking switch fabric having the first set of intra-domain switches, a second set of intra-domain switches, and a set of inter-domain switches located between the first set of intra-domain switches and the second set of intra-domain switches, the method comprising:
   at an outside edge port of the intra-domain switch, inserting, in a packet that must travel between domains, an inter-domain routing prefix identifying both a source and a destination domain; and
   passing the packet that must travel between domains to one of the inter-domain switches via an inside edge port of the intra-domain switch, the method including:
   classifying an incoming packet as an ordered packet or an unordered packet;
   for an ordered packet, forwarding the incoming packet to a port identified by a spread routing table using a hash of source and destination identifications as a table index; and
   for an unordered packet, forwarding the incoming packet to a currently least utilized port, that leads to a root of the non-blocking switch fabric, having a smallest accumulator value, wherein an accumulator value for a port is increased by a value proportional to a length of each packet being forwarded to that port.

12. An apparatus operating an intra-domain switch in a first set of intra-domain switches in a non-blocking switch fabric having the first set of intra-domain switches, a second set of intra-domain switches, and a set of inter-domain switches located between the first set of intra-domain switches and the second set of intra-domain switches, the apparatus comprising:
   means for, at an outside edge port of the intra-domain switch, inserting, in a packet that must travel between domains, an inter-domain routing prefix identifying both source destination domains;
   means for passing the packet that must travel between domains to one of the intra-domain switches via an inside edge port of the intra-domain switch,
   means for classifying an incoming packet as an ordered packet or an unordered packet;
   for an ordered packet, forwarding the incoming packet to a port identified by a spread routing table using a hash of source and destination identifications as a table index; and
   for an unordered packet, forwarding the incoming packet to a currently least utilized port, that leads to a root of the non-blocking switch fabric, having a smallest accumulator value, wherein an accumulator value for a port is increased by a value proportional to a length of each packet being forwarded to that port.

* * * * *